Patented Dec. 15, 1942

2,305,236

UNITED STATES PATENT OFFICE 2,305,236

PROCESS FOR PREPARING PURE CAPRYL ALCOHOL AND METHYL-n-HEXYL KETONE

Herman A. Bruson, Philadelphia, Pa., assignor to The Resinous Products & Chemical Company, Philadelphia, Pa.

No Drawing. Application March 28, 1940, Serial No. 326,381

3 Claims. (Cl. 260—593)

This invention relates to a process for preparing pure methyl-n-hexyl ketone and pure octanol-2 (capryl alcohol) in high yields from the commercial crude mixture of these two components, which is ordinarily obtained when castor oil is heated with caustic alkalies.

Crude capryl alcohol, as made above, contains from about 15% to 30% by weight of methyl-n-hexyl ketone, but thus far, no satisfactory method has been available for effectively separating these two compounds in pure form at a reasonable cost. Their boiling points lie too close together for an efficient separation by distillation. Consequently, pure capryl alcohol has been made commercially by catalytically hydrogenating the technical mixture of capryl alcohol and methyl hexyl ketone so as to completely reduce the latter compound to octanol-2; and, on the other hand, pure methyl hexyl ketone has been obtained by catalytically oxidizing the technical mixture so as to convert all of the alcohol present to the ketone.

It has now been found that capryl alcohol containing methyl-n-hexyl ketone may be purified by converting the alcohol to a sec-octyl borate, distilling out the ketone and hydrolyzing the residue to regenerate the capryl alcohol. The process is carried out, in general, by heating the mixture of capryl alcohol and methyl-n-hexyl ketone with boric acid, distilling out the water resulting from the esterification of the alcohol and then distilling out the methyl-n-hexyl ketone, preferably under reduced pressure. When the ketone has been removed, the residue is dissolved in water and heated to hydrolyze the sec-octyl borate and regenerate the capryl alcohol. The regenerated boric acid thus formed may be recovered and used over again. Capryl alcohol is a secondary alcohol and is very sensitive to mineral acids of a dehydrating character, but not even a trace of octene is formed when it is heated with boric acid at the high temperatures necessary for the complete removal of the methyl hexyl ketone.

In practicing this invention, it has been found advantageous to use an excess of boric acid over that which would theoretically be required to combine with all of the capryl alcohol present to form tri-sec-octyl borate. An excess of from 15 to 20% has been found to be useful for the purpose. The heating may be carried out in the presence of an inert organic solvent, such as toluene, to help carry off the water, but this is unnecessary.

The methyl hexyl ketone obtained can, if necessary, be subsequently reheatd with a smaller quantity of boric acid to remove any residual capryl alcohol which might have come over with it due to hydrolysis of the borate by traces of moisture in the apparatus. The process yields both capryl alcohol and methyl hexyl ketone of C. P. quality, and in almost quantitative yields. The following examples illustrate this invention.

*Example 1*

The following mixture was boiled for three hours while being rapidly stirred under a reflux condenser attached to a water trap so arranged that the water which collected in the trap was continually run off, whereas, the volatile organic distillate comprising the upper layer automatically ran back into the reaction vessel:

|  | Grams |
|---|---|
| Crude capryl alcohol (86% purity) | 780 |
| Toluene | 200 |
| Boric acid | 124 |

97 cc. of water separated in the water trap and was discarded. The temperature of the batch gradually rose to 155° C. The toluene was then distilled off at ordinary pressure through a short, packed column. The residual oil was then cooled down and distilled under reduced pressure (6 mm.), whereupon 107 g. of methyl-n-hexyl ketone distilled over at about 50° C. Upon redistillation at ordinary pressure, this gave 105 g. of product boiling at 173–175° C., equivalent to 97% of the methyl hexyl ketone originally present in the mixture. The residual tri-sec-octyl borate was boiled for one-half hour with 400 cc. of water and the aqueous layer separated while hot. On cooling, the boric acid crystallized out and was recovered. The upper capryl alcohol layer was distilled through a short, packed column, and yielded 610 g. of capryl alcohol having a purity better than 99%.

*Example 2*

A mixture consisting of 124 g. of boric acid and 780 g. of crude, dry capryl alcohol was boiled under a reflux condenser attached to a water trap, for three hours, until no more water distilled off. Any organic distillate was automatically returned to the reaction mixture during this heating. The temperature gradually rose during this period to 228° C. The mixture was then allowed to cool down and the methyl hexyl ketone stripped off by heating the mixture under reduced pressure. It came over at 50–55° C. under 5–10 mm. absolute pressure, and weighed 112 g.

Upon redistillation at atmospheric pressure, most of it boiled at 173–175° C. Analysis indicated that the distillate still contained 10% of capryl alcohol as impurity. This was removed by boiling the distillate with 18.6 g. of boric acid in the manner described above, and after removal of the water, stripping off the pure ketone under reduced pressure from the small amount of the tri-sec-octyl borate. The final yield of pure methyl hexyl ketone was 99 g.

The residual tri-sec-octyl borate from the combined residues yielded 621 g. of pure capryl alcohol upon hydrolysis with hot water, as described in Example 1.

I claim:

1. The process of separating capryl alcohol and methyl-n-hexyl ketone which comprises heating a mixture of said compounds with boric acid to convert the capryl alcohol to a sec-octyl borate, removing water from the reaction mixture, distilling out the methyl-n-hexyl ketone and hydrolyzing the residue to regenerate the capryl alcohol.

2. The process of separating capryl alcohol and methyl-n-hexyl ketone which comprises heating a mixture of said compounds in the presence of an inert solvent with boric acid to convert the capryl alcohol to a sec-octyl borate, removing water from the reaction mixture, distilling out the inert solvent and the methyl-n-hexyl ketone and hydrolyzing the residue to regenerate the capryl alcohol.

3. The process of recovering purified capryl alcohol and methyl-n-hexyl ketone from mixtures thereof which comprises converting the capryl alcohol present in said mixtures to a sec-octyl borate, distilling out the methyl-n-hexyl ketone and hydrolyzing the residue to regenerate the capryl alcohol.

HERMAN A. BRUSON.